(12) United States Patent
Suslov et al.

(10) Patent No.: US 11,176,789 B2
(45) Date of Patent: Nov. 16, 2021

(54) ORDERING INSTRUCTIONS DEVICE

(71) Applicant: ORDERCUBE GmbH, Grafing (DE)

(72) Inventors: Igor Suslov, Grafing (DE); Daniel Pasternak, Grafing (DE)

(73) Assignee: ORDERCUBE GMBH, Grafing (DE)

( * ) Notice: Subject to any disclaimer, the term of this patent is extended or adjusted under 35 U.S.C. 154(b) by 231 days.

(21) Appl. No.: 16/412,700

(22) Filed: May 15, 2019

(65) Prior Publication Data

US 2019/0266861 A1 Aug. 29, 2019

Related U.S. Application Data

(63) Continuation-in-part of application No. PCT/EP2017/079352, filed on Nov. 15, 2017.

(30) Foreign Application Priority Data

Nov. 15, 2016 (DE) .................. 20 2016 106 406
Mar. 17, 2017 (EP) ..................... 17161642

(51) Int. Cl.
*G08B 7/06* (2006.01)
*G08B 5/22* (2006.01)
(Continued)

(52) U.S. Cl.
CPC ............... *G08B 7/068* (2013.01); *G08B 5/00* (2013.01); *G08B 5/223* (2013.01); *G08B 5/36* (2013.01);
(Continued)

(58) Field of Classification Search
None
See application file for complete search history.

(56) References Cited

U.S. PATENT DOCUMENTS 6,366,196 B1 4/2002 Green et al.
2002/0133713 A1* 9/2002 Fieschi .................. G06F 21/88
726/26

(Continued)

FOREIGN PATENT DOCUMENTS

DE 1993861 U 9/1968
DE 29509928 U1 1/1996
(Continued)

OTHER PUBLICATIONS

International Application No. PCT/EP2017/079352, International Search Report and Written Opinion dated Jan. 18, 2018, 16 pages.
(Continued)

*Primary Examiner* — Carlos Garcia
(74) *Attorney, Agent, or Firm* — Zhong Law, LLC

(57) ABSTRACT

An ordering indication device for use in restaurants, guest houses, hotels, catering companies, and the like, the ordering indication device including an input means, which can be operated by a guest, a communications interface, an optical indicator means, and a control unit, wherein the setting of the brightness of the one or more first light sources and the setting of the brightness of the one or more second light sources depend on an environmental condition, wherein the input means is operatively connected to the optical indicator means via the control unit such that the optical indicator means signals the activation process of the input means by means of an optical signal, following an activation of the optical indicator means by the input means, wherein the optical indicator means, following activation thereof, outputs an optical continuous signal, which can be deactivated.

21 Claims, 9 Drawing Sheets

(51) Int. Cl.
    *G08B 5/36*     (2006.01)
    *G08B 5/38*     (2006.01)
    *G08B 13/189*     (2006.01)
    *G08B 5/00*     (2006.01)
    *G06Q 30/06*     (2012.01)

(52) U.S. Cl.
    CPC ................ *G08B 5/38* (2013.01); *G08B 7/06* (2013.01); *G08B 13/1895* (2013.01); *G06Q 30/0633* (2013.01)

(56) References Cited

U.S. PATENT DOCUMENTS

| | | | |
|---|---|---|---|
| 2005/0040229 A1* | 2/2005 | Andrews | E05B 45/06 235/382 |
| 2009/0027226 A1 | 1/2009 | Mannke, Jr. | |
| 2010/0090825 A1* | 4/2010 | Freathy | G08B 21/0286 340/539.13 |
| 2013/0067967 A1* | 3/2013 | Olear | E05B 73/0082 70/18 |
| 2013/0265164 A1* | 10/2013 | Brown | E05B 73/0005 340/568.2 |
| 2015/0199720 A1 | 7/2015 | Dublin, III et al. | |

FOREIGN PATENT DOCUMENTS

| | | |
|---|---|---|
| DE | 102004001210 A1 | 7/2005 |
| GB | 2288481 A | 10/1995 |
| WO | 2009143062 A2 | 11/2009 |
| WO | 2010136973 A1 | 12/2010 |

OTHER PUBLICATIONS

European Application No. EP17161642, Extended European Search Report dated Sep. 27, 2017, 9 pages.

* cited by examiner

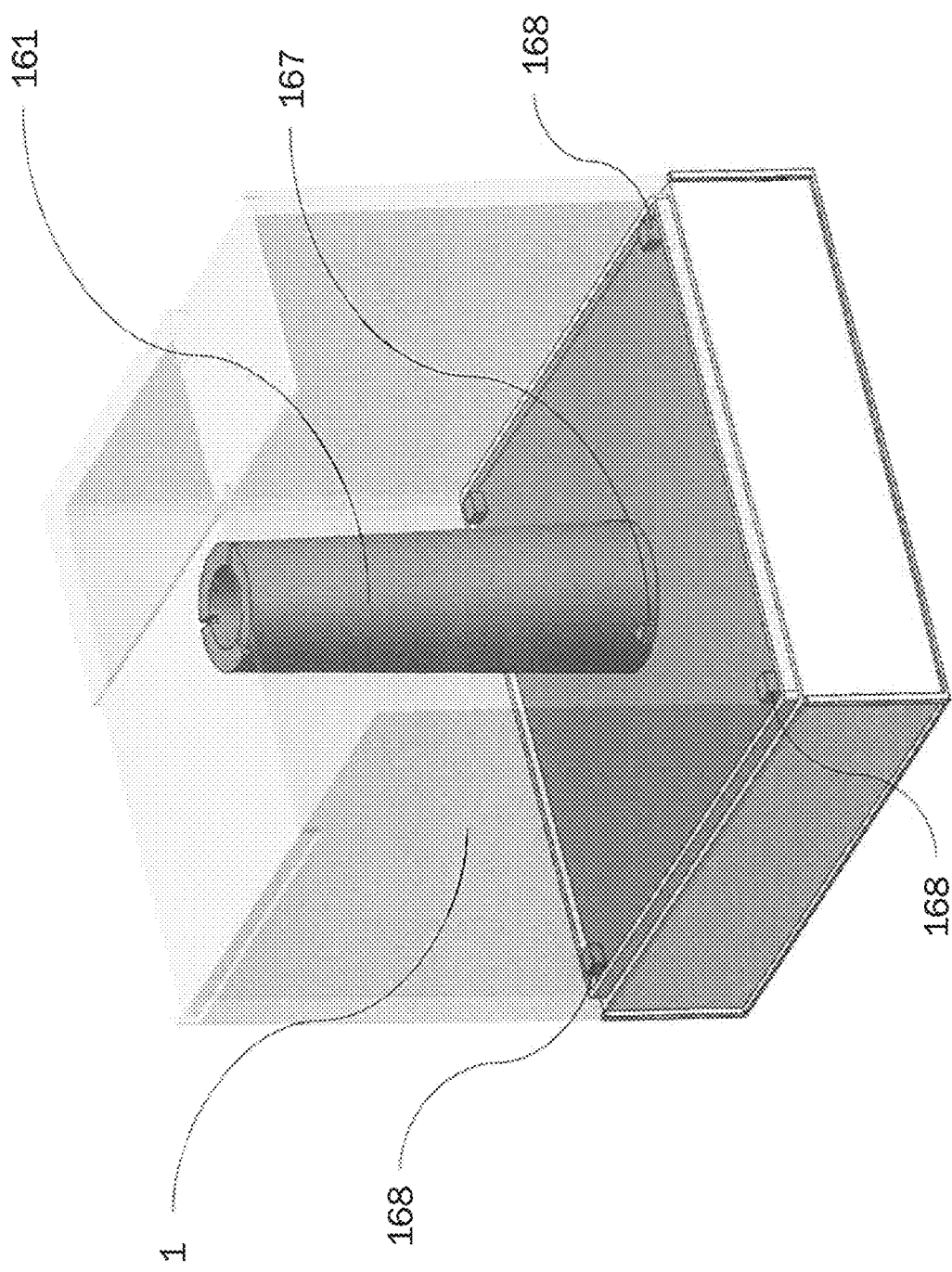

ORDERING INSTRUCTIONS DEVICE

CROSS-REFERENCE TO RELATED APPLICATIONS

This application is a continuation-in-part application of PCT/EP2017/079352 filed on Nov. 15, 2017, which claims priority to German application DE 202016106406 filed on Nov. 15, 2016 and priority to European application EP 17161642.8 filed on Mar. 17, 2017. All of the above-mentioned applications are incorporated by reference in their entireties.

TECHNICAL FIELD

The present disclosure generally pertains to an ordering indication device, specifically a system for signaling a service request to service staff, for use in particular, in restaurants, guest houses, hotels, catering companies and the like. The present disclosure particularly pertains to an ordering indication device with enhanced visibility.

BACKGROUND

Different variations of waitstaff call systems typically include an input means that can be actuated by a guest at a table or counter and equipped with a transmitter, wherein the transmitter transmits a signal, which provides information on an order request of a guest and optionally additional information, to at least one receiving device.

The use of such systems on the one hand makes it easier for the guest to place an order request and on the other hand noticeably signals an order request of a certain guest or certain table to the service personnel.

DE1993861U relates to a waitstaff call system that comprises an optical signaling apparatus, which makes it possible to draw the attention of the service personnel to a guest. This waitstaff call system is equipped with a battery that makes it possible to install the system on a table or the like. Furthermore, DE29509928U1 relates to a waitstaff call device that consists of a table lamp with exposed luminous elements. The luminous elements can be turned on by means of an associated switch for signaling purposes.

The disadvantages of the aforementioned waitstaff call systems can be seen in that their operations are not transparent and therefore correspondingly confusing for the waitstaff, as well as for the guest, and in that they lack interfaces for terminals, particularly mobile terminals such as smartphones, smartwatches or tablets. Due to their technical concept and size, previous apparatuses furthermore do not serve as candle substitutes such that it is difficult to place the systems on an already crowded restaurant table.

Another problem can be seen in that the visibility of such a waitstaff call system or ordering indication device can vary depending on the weather and the time of day. For example, the visibility of the ordering indication device in a bright environment, e.g. during the day in sunny weather, may be worse than in the evening after sunset because an equally bright luminescence is in a bright environment not perceived as well as in a dark environment.

Furthermore, the visibility may significantly vary locally depending on the location. For example, the visibility of an ordering indication device may—in the same weather and at the same time of day—be worse in the sun than in the shade.

Another problem can be seen in that the systems can be easily stolen. Enhanced visibility in case of a theft would be desirable.

An ordering indication device with enhanced visibility under different external conditions, particularly under different external light conditions, at different locations or under different force effects (accelerations, motions) would be desirable.

SUMMARY OF THE DISCLOSURE

The embodiments of the present disclosure include an ordering indication device that eliminates the aforementioned problems and other deficiencies of existing systems. The embodiments of the disclosure simplify and optimize the ordering process in a restaurant, guest house, hotel, catering company or the like for guests and for the service personnel. Guests should no longer have to worry about the service personnel and compete for its attention. The service personnel should furthermore be able to comprehensively track how long which guest waits to be served.

According to the disclosure, an ordering indication device of the initially cited type is characterized in that the input means is functionally connected to an indicator means in such a way that the indicator means signals the actuation process of the input means by means of an optical signal after the activation of the indicator means by the input means, wherein the optical indicator means outputs after its activation an optical continuous signal that can be deactivated. In an embodiment, an apparatus for measuring the time period since the last activation of the optical continuous signal is provided. This apparatus makes it possible to determine how long a guest has already waited for the service personnel, wherein this waiting process can be visualized by means of the optical indicator means. The color of the optical continuous signal may change in dependence on the time. In embodiments, the actuation process of the input means can be transmitted to a control device via a communications interface.

Such a visualization of the wait time basically can be realized in different ways. In a first embodiment, for example, the light intensity of the optical continuous signal can be varied in dependence on the time. The color of the optical continuous signal is varied in dependence on the time in a second embodiment and/or the frequency of the optical continuous signal is varied in dependence on the time in a third embodiment, wherein the aforementioned embodiments may by all means also be combined. In addition, other optical signal variations naturally are also conceivable.

In this case, the variation of the color, the light intensity and/or the frequency of the optical continuous signal advantageously takes place in time intervals such that, for example, a low light intensity is initially set for a predefined time period and after a few minutes changes to a higher light intensity, etc.

The aforementioned designs are described in greater detail below with reference to a concrete exemplary embodiment.

The ordering indication device may be positioned on a restaurant table in the form of a candle substitute and changes its mode from "candle flickering" to a color interval, which can be individually set with respect to its time and color, as soon as the guest would like to be served and has pressed the "call button" provided for this purpose. A color change, e.g., from green to red ensures that the waiter can determine at a glance how long which guest has already waited to be served. The same principle also applies to the "pay button" when the guest would like to pay.

Furthermore, the waiter may also be able to obtain this information by means of an optional software/app for terminals, particularly mobile terminals such as smartphones, tablets and smartwatches, and thereby receive an additional overview even if the ordering indication device is not located in the waiter's field of vision.

Statistics generated by the ordering indication device and displayed on the software/app enable the restaurant proprietor to coordinate the personnel requirement in the short term, as well as in the long term.

A corresponding interface with the ordering indication device furthermore enables the restaurant proprietor to also control the occupancy rate and the state of affairs in his business while he is on the road.

The variation of the color, the light intensity and/or the frequency of the optical continuous signal may furthermore be dependent on an operating state of the ordering indication device and/or on one or more input parameters on the input means.

The ordering indication device for use in restaurants, guest houses, hotels, catering companies and the like comprises an input means that can be actuated by a guest, a communications interface, an optional memory, an optical indicator means and a control unit. The optical indicator means comprises one or more first light sources and optionally one or more second light sources. The setting of the brightness of the one or more first light sources and optionally the setting of the brightness of the one or more second light sources depend on an environmental condition. In addition, the input means is functionally connected to the indicator means via the control unit in such a way that the optical indicator means signals the actuation process of the input means by means of an optical signal after the activation of the indicator means by the input means, wherein the optical indicator means outputs after its activation an optical continuous signal, which can be deactivated, and wherein an apparatus for measuring the time period since the activation of the optical continuous signal is optionally provided.

In embodiments, the ordering indication device furthermore comprises one or more sensors. The one or more sensors may comprise a brightness sensor. Alternatively or additionally, the one or more sensors may comprise a motion sensor. Alternatively or additionally, the one or more sensors may comprise a proximity sensor. The environmental condition on which the setting of a brightness and/or a color and/or an effect of the one or more first light sources and optionally the setting of a brightness and/or a color and/or an effect of the one or more second light sources depends may be determined by the one or more sensors. The setting of the brightness and/or the color and/or the effect of the one or more first light sources and optionally the setting of the brightness and/or the color and/or the effect of the one or more second light sources may alternatively or additionally depend on further conditions such as for example on a time provided e.g. by a clock unit.

In embodiments, the ordering indication device furthermore may comprise a brightness sensor for measuring the ambient brightness and is configured for adapting the brightness of the one or more first light sources and the one or more second light sources to the measured ambient brightness.

In embodiments, the ordering indication device furthermore may comprise a reader for reading information from an information carrier, particularly a short-range wireless interface for reading a (radio) signal such as a WLAN interface for reading a WLAN signal, a Bluetooth® interface for reading a Bluetooth® beacon and/or a near-field communications reader (NFC reader) for reading information from a near-field communications tag (NFC tag) and similar.

In embodiments, a setting of the electronics such as a setting of the one or more first light sources and/or a setting of the one or more second light sources depends on information read by the reader.

In embodiments, the ordering indication device is localized in order to determine its position.

In embodiments, the ordering indication device furthermore comprises a theft deterrent or theft prevention or theft protection arrangement. The terms theft deterrent, theft prevention and theft protection are used synonymously below. In embodiments, the theft prevention arrangement comprises a theft detection device. In embodiments, the theft prevention arrangement comprises a motion detector that is configured for triggering an alarm during an attempted theft of the ordering indication device.

A theft detection device is provided in embodiments, wherein said theft detection device is activated by means of signals and localizes the ordering indication device.

In embodiments, the ordering indication device is localized with the aid of a positioning system such as the Global Positioning System (GPS), GLONASS, Galileo, Beidou or any other global, regional or local positioning system.

In embodiments, a mesh network is used for detecting that an ordering indication device is missing in the network. This may also be used for a theft protection indication on the ordering indication device. For example, when an ordering indication device loses all its connections, it may start beeping. When an ordering indication device loses all its connections, it may enter a pre-alarm state or an alarm state.

The theft prevention may additionally or alternatively also be realized by means of a wireless apparatus that is linked to an object on the table (also referred to as "object" or "table object" below) or by means of an information carrier that is linked to the table object. For example, a beacon or an NFC may be linked to the table object. For example, a wireless transmitter, a beacon or an NFC tag may be installed in the table object or rigidly arranged thereon. The table object may be realized, for example, in the form of a holder. The table object may have a receptacle space for the ordering indication device. The table object may additionally or alternatively also have a receptacle space for spice shakers, particularly for salt, pepper and/or chili powder, a receptacle space for sauce containers, particularly (bottles of) soy sauce or chili sauce, space for silverware, space for menus and/or space for napkins. The holder particularly may be realized in the form of a salt/pepper holder or a napkin holder. The information carrier can be read by the ordering indication device as long as the ordering indication device is positioned in the receptacle space. It is thereby determined that the distance between the object and the ordering indication device is short. This leads to the conclusion that the ordering indication device is still positioned at the correct location.

If the ordering indication device is moved away from the table object, i.e. if the ordering indication device is removed from its receptacle space in the holder, the signal strength of the link between the object and the ordering indication device drops or the signal link is entirely lost. It is thereby determined that the ordering indication device was removed from the receptacle space, i.e. moved away from the table object. An alarm is triggered if the ordering indication device is not returned within a defined time period.

Furthermore, the theft protection may additionally or alternatively also be realized by means of a magnetic field. For example, one or more permanent magnets or one or more coils may be arranged underneath the table. In this case, the ordering indication device may be equipped with a magnetic field detection arrangement. The ordering indication device triggers an alarm if the ordering indication device is removed from the table and not returned to the table within a time period that is defined by a server—such as a restaurant owner or a waiter—with the aid of the software/app.

In embodiments, the output of the alarm signal includes blinking of the optical output means, particularly the one or more second light sources. Blinking in the presently described context includes blinking in the actual sense (i.e. with largely immediate activation and deactivation) or pulsating (i.e. with increasing and decreasing signal strength) or a combination of actual blinking and pulsating.

In embodiments, the ordering indication device furthermore comprises a vibration source, wherein the output of the alarm signal may include a vibration. In embodiments, the vibration source may be a motor.

In embodiments, the ordering indication device furthermore comprises a loudspeaker, wherein the output of the alarm signal may include an audio output via the loudspeaker. The loudspeaker may alternatively or additionally serve as vibration source in embodiments, wherein the output of the alarm signal may include a vibration.

In embodiments, the output of the alarm signal includes an electronic transmission of an alarm signal to a control device via the communications interface.

In embodiments, the output of the alarm signal takes place in stages, wherein the control unit initiates a first of the stages if the motion detector transmits a signal to the control unit longer than a first threshold time period and the control unit initiates a second of the stages if the motion detector transmits a signal to the control unit longer than a second threshold time period.

In embodiments, the optical output means furthermore comprises a light conductor, wherein the light conductor furthermore is essentially realized in the form of a hollow truncated cone or a tapered hollow cylinder.

In embodiments, the light conductor comprises on a first end one or more first recesses, wherein the one or more first light sources are respectively arranged in the one or more first recesses, and wherein the one or more second light sources are arranged in the ordering indication device farther outward than the one or more first light sources.

In embodiments, the light conductor comprises on a second end at least one second recess for leading through at least one cable.

In embodiments, the ordering indication device comprises a touchscreen.

In embodiments, the ordering indication device comprises an inductive charging coil for allowing contactless charging of a power source of the ordering indication device.

In embodiments, the ordering indication device comprises a reservation state, wherein in the reservation state, the optical indicator means is configured to be indicative of the reservation.

In embodiments, the ordering indication device comprises a projector, wherein the projector is designed for projecting information on a placement surface of the ordering indication device.

In embodiments, the ordering indication device comprises a projector, wherein the projector is designed for projecting information on a placement surface of the ordering indication device and wherein the projector is designed for projecting information on a placement surface of the ordering indication device, and wherein the brightness of the projected information is taken into account in the setting of the brightness of the one or more first light sources and in the setting of the brightness of the one or more second light sources.

In embodiments, the ordering indication device furthermore comprises a memory.

In embodiments, a firmware of the ordering indication device can be updated via the communication interface.

In embodiments, the ordering indication device further comprises a proximity detection device for detecting a presence of a waiter in the proximity of the ordering indication device (1) for causing a deactivation of the optical continuous signal.

In embodiments, the ordering indication device further comprises a plurality of sensor devices coupled to the control unit, wherein the control unit of the ordering indication device combines data received from the plurality of sensor devices to control the optical indicator means. A candle behavior may be mimicked thereby. Additionally or alternatively, the optical indicator means may be controlled to show different behavior (than a candle behavior).

In embodiments, the ordering indication device comprises a reader, wherein the reader is configured to accept payment data. In embodiments, the reader comprises an NFC reader, wherein the NFC reader is configured to accept payment data via near-field communications.

Another aspect of the present disclosure concerns a system with a plurality of ordering indication devices of the type described in the present disclosure, wherein the system comprises a corresponding plurality of information carriers such as near-field communications tags.

In embodiments of the system, the plurality of ordering indication devices respectively comprise a reader, for example a near-field communications reader, for reading information from a plurality of information carriers, for example near-field communications tags, wherein the plurality of ordering indication devices can be wirelessly connected to a control device via the respective communications interfaces.

Another aspect of the present disclosure concerns a method for setting an optical indicator means of an ordering indication device that comprises an input means, a communications interface, a motion detector, an optional memory, the optical indicator means and a control unit, wherein the optical indicator means comprises one or more first light sources and optionally one or more second light sources. The input means is functionally connected to the optical indicator means in such a way that the optical indicator means signals the actuation process of the input means by means of an optical signal after the activation of the indicator means by the input means. After its activation, the optical indicator means outputs an optical continuous signal that can be deactivated. Furthermore, an apparatus for measuring the time period since the activation of the optical continuous signal is optionally provided. The setting of the brightness of the one or more first light sources and optionally the setting of the brightness of the one or more second light sources depends on an environmental condition.

Another aspect of the present disclosure concerns a method for outputting an alarm signal during an attempted theft of an ordering indication device of the type described in the present disclosure, wherein the method includes the output of an alarm signal during an attempted theft.

BRIEF DESCRIPTION OF THE DRAWINGS

Other objectives, characteristics, advantages and potential applications of the ordering indication device can be gathered from the following description of an exemplary embodiment with reference to the drawings. In this case, all described and/or graphically illustrated characteristics form the object of the disclosure individually or in any combination, namely regardless of their composition in the individual claims or their references to other claims.

In the drawings,

FIG. 8 shows the light conductor according to FIG. 6 or 7, which is installed in an exemplary ordering indication device.

DETAILED DESCRIPTION

Figure 1:
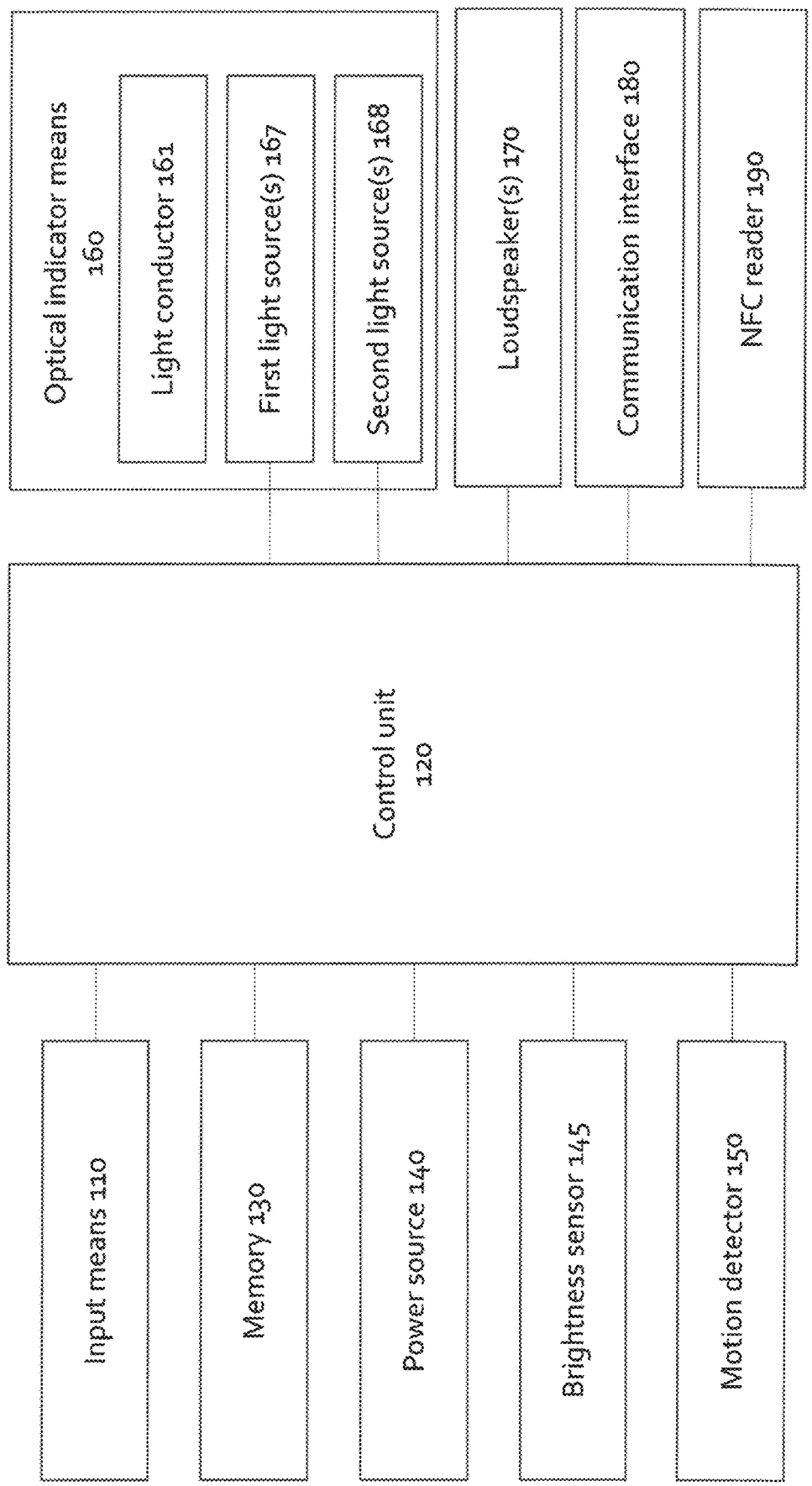
FIG. 1 shows an embodiment of an ordering indication device.

According to FIG. 1, the ordering indication device 1 comprises an input means 110 that can be actuated by a guest, a control unit 120 and an optical indicator means 160. The optical indicator means 160 comprises one or more first light sources 167 and one or more second light sources 168.

Figure 3:
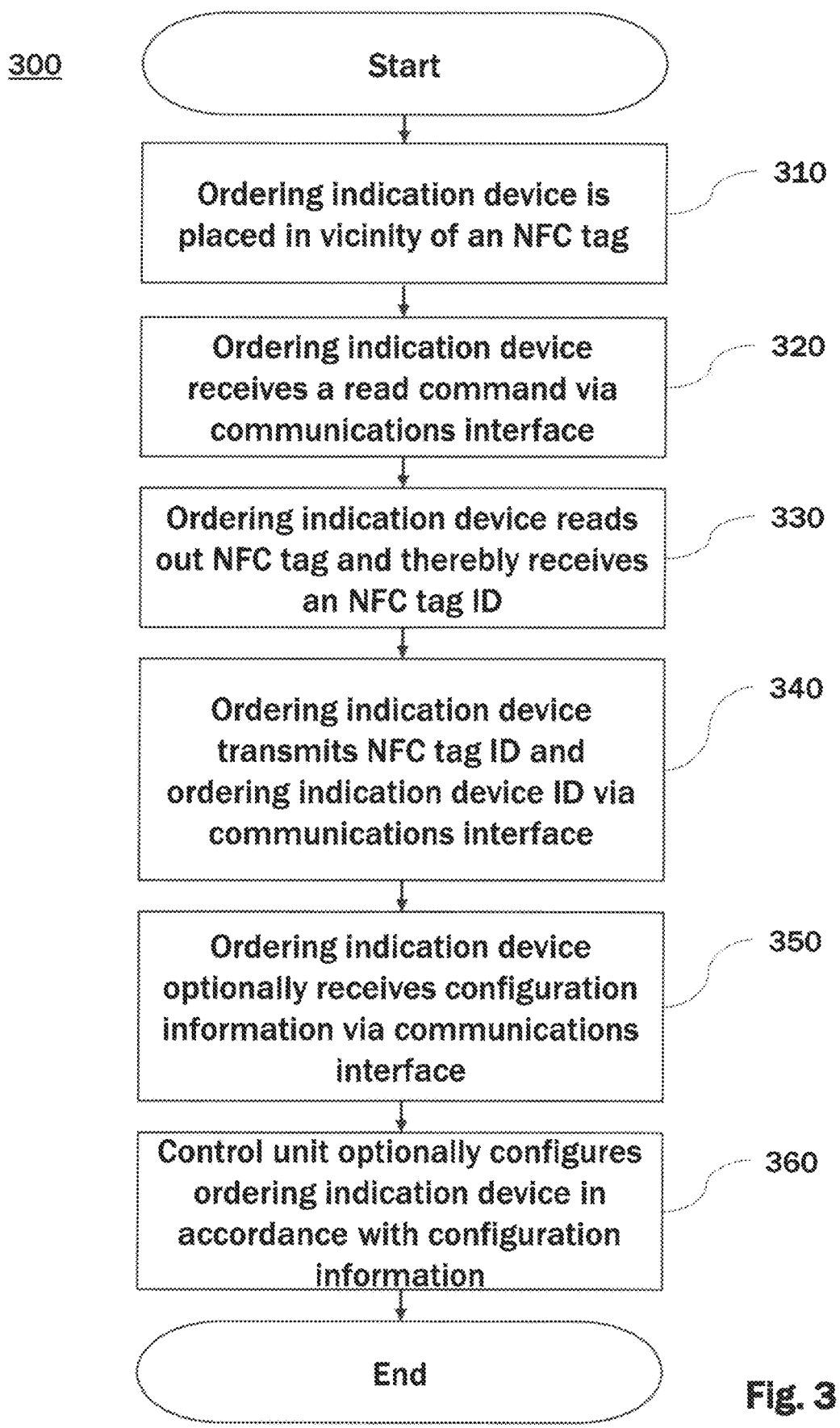
FIG. 3 shows a method for configuring an ordering indication device by means of a near-field communications tag.

The input means may be connected to a communications interface 180 via a control unit 120. In embodiments, a signal can thereby be transmitted to at least one control device 3 (see FIG. 3) via the communications interface 180 when a guest actuates the input means 110, wherein said signal provides information on an order request of a guest and optionally additional information.

The ordering indication device 1 may contain a memory 130. For example, this enables the ordering indication device 1 to store settings that can be individualized.

The ordering indication device 1 may contain its own power source 140 such as a battery or an accumulator. In this way, the ordering indication device 1 can also be used at locations without access to the power supply system (e.g. outdoors) and is easily transportable.

In embodiments, the ordering indication device 1 furthermore comprises one or more sensors 145, 150. The one or more sensors may comprise a brightness sensor. Alternatively or additionally, the one or more sensors may comprise a motion sensor. Alternatively or additionally, the one or more sensors may comprise a proximity sensor. The environmental condition on which the setting of a brightness and/or a color and/or an effect of the one or more first light sources and optionally the setting of a brightness and/or a color and/or an effect of the one or more second light sources depends may be determined by the one or more sensors. The setting of the brightness and/or the color and/or the effect of the one or more first light sources and optionally the setting of the brightness and/or the color and/or the effect of the one or more second light sources may alternatively or additionally depend on further conditions such as for example on a time provided e.g. by a clock unit.

Furthermore, the ordering indication device 1 may contain a brightness sensor 145. In this way, the ordering indication device 1 can measure the ambient light conditions and adapt its settings to the measured ambient light conditions.

Furthermore, the ordering indication device 1 may contain a motion detector 150. This enables the ordering indication device 1 to detect a motion thereof. For example, the motion detector 150 can in embodiments detect a motion of the ordering indication device 1 based on position data of a positioning system.

The ordering indication device 1 can adapt its settings depending on whether it is moved and optionally how it is moved. The ordering indication device may contain a GPS transmitter. The ordering indication device 1 may be able to transmit its position with the aid of the GPS transmitter.

As already mentioned above, the optical indicator means 160 contains one or more first light sources 167 and one or more second light sources. The optical indicator means 160 may furthermore comprise a light conductor 160.

Furthermore, the ordering indication device 1 may comprise a loudspeaker 170 for outputting an audio signal.

As already mentioned above, the ordering indication device 1 contains a communications interface 180. This communications interface 180 may be a wireless communications interface. This wireless communications interface may comprise Bluetooth® or a communications interface according to industry standard IEEE 802.15.1 and/or a WLAN communications interface or a communications interface according to a standard of the IEEE 802.11 family and/or a similar communications interface.

In embodiments, a firmware of the ordering indication device 1 may be able to be updated via the communication interface 180. The update may occur wirelessly. The firmware of several ordering information devices 1 may be updatable simultaneously via a mesh network.

Furthermore, the ordering indication device 1 may comprise a reader for reading information from an information carrier. The reader particularly may comprise a short-range wireless interface for reading a radio signal such as a Bluetooth® interface for reading a Bluetooth® beacon, a WLAN interface for reading a WLAN signal and/or a near-field communications reader (NFC reader) 190 for reading a near-field communications tag 2. In embodiments the NFC reader 190 may alternatively or additionally be configured to read and/or accept payment data.

The ordering indication device 1 may be realized in the form of a cube, particularly a largely transparent luminous cube. Text surfaces may be punched out on the input means 110 (touch buttons). In this way, these text surfaces can also be read and distinguished in the dark.

The advantages of this embodiment of the ordering indication device 1 for catering companies and restaurants can be seen in that it may replace candles on a restaurant table and forms a light gadget, which can be individualized and furthermore contributes to an enhanced overview for the waitstaff, as well as to a stress minimization and greater satisfaction of the guests.

It is furthermore possible to efficiently configure a plurality of ordering indication devices.

This "plug-and-play" solution makes it possible to realize the operation of the ordering indication device in a particularly intuitive and therefore simple manner for restaurant proprietors and their waitstaff, as well as for guests.

In contrast to similar concepts, the ordering indication device 1 may have two light sources—particularly two sets of light sources. One set of light sources may be optimized for good diffusion and the other set of light sources may be optimized for good visibility. In this way, enhanced visibility can be achieved under different conditions, particularly different external conditions.

According to another aspect of the present disclosure, the optical indicator means may comprise a flat-screen display. In embodiments, an upper surface of the ordering indication device comprises the flat-screen display. In embodiments, a flat-screen display is positioned on one or more lateral surfaces and at least partially or completely covers the one or more lateral surfaces. In embodiments, the ordering indication device includes four lateral surfaces and an upper surface. In embodiments, the surface of the ordering indication device consists completely of flat-screen displays. In embodiments, a placement surface of the ordering indication device, which forms part of the surface of the ordering indication device, is excluded from consisting of flat-screen displays. In other words, the placement surface is in these embodiments not covered by a flat-screen display. In embodiments, the flat-screen displays used are realized in the form of liquid crystal displays (LCD displays). In embodiments, the flat-screen displays are realized in the form of touch-sensitive displays (touchscreens). In some variations, the touchscreen(s) may be the input means of the ordering indication device. The touchscreen(s) may thus replace buttons that might be provided alternatively or additionally as the input means. The touchscreen(s) may thus provide a graphical user interface for certain features.

In embodiments, the ordering indication device comprises a charging port, in particular an inductive charging port. The inductive charging port may comprise a coil. Contactless charging of a power source of the ordering indication device may be enabled.

A corresponding charging device or a charging station for charging the ordering indication device may also comprise a charging port. The charging port may comprise an inductive charging port. In particular, the charging device or charging station may comprise an induction coil. Contactless charging of a power source of the ordering indication device may be enabled.

The contactless charging of the ordering indication device allows for rendering the ordering indication device fully waterproof.

In embodiments, the ordering indication device may comprise a reservation state, wherein in the reservation state, the optical indicator means is configured to be indicative of the reservation.

In general embodiments of the disclosure, the optical indicator means merely is a means that indicates information such as an order request of a guest. For example, the optical indicator means may comprise one or more light sources.

Brightness Setting According to Ambient Light

The ordering indication device may comprise a brightness sensor 145 for measuring the ambient brightness. In embodiments, the one or more first light sources 167 and the one or more second light sources 168 are switched off in order to measure the ambient brightness and after the measurement reconfigured in the same way as prior to the measurement. This ensures that the measurement actually measures the ambient brightness and the measurement is not falsified by the optical indicator means 160.

The brightness sensor 145 may be realized, for example, in the form of a phototransistor. Downstream resistors and/or capacitors may be connected to the brightness sensor 145. Brightness sensors 145, particularly phototransistors, frequently are very sensitive such that an overamplification of the output signal of the brightness sensor 145 can occur. The resistors make it possible to keep the output of the brightness sensor 145 in the desired range. In other words, the control of the one or more first light sources 167 and the one or more second light sources 168 can also be adapted to the ambient brightness measured by a very sensitive brightness sensor 145.

Brightness sensors 145, particularly phototransistors, furthermore can react very fast. Artificial light such as the light of fluorescent lamps or fluorescent tubes frequency is not constant, but rather varies with a sine wave from the power supply system. In this case, a frequency from the power supply system, which may amount to 50 Hz or 60 Hz, is transferred to the artificial light. Although humans generally do not perceive this flickering, a brightness control of the one or more first light sources 167 and the one or more second light sources 168, which is based on an ambient brightness that is directly measured with a brightness sensor 145, could involve an active brightness control. The light signal of the brightness sensor 145 can be smoothed by using one or more capacitors. This prevents a very active brightness control of the one or more first light sources 167 and the one or more second light sources 168 and thereby preserves the power source (e.g. a battery or an accumulator).

An embodiment of the ordering indication device may be configured for adapting the brightness of the one or more first light sources 167 and the one or more second light sources 168 to the measured ambient brightness.

In this way, the ordering indication device is clearly visible in a dark environment, as well as in a bright environment.

Furthermore, the one or more second light sources 168 may be arranged farther outward in the ordering indication device 1 than the one or more first light sources 167. As a result, the one or more second light sources 168 may be more visible. Furthermore, the one or more first light sources 167 may be arranged in such a way that the one or more first light sources 167 emit light, which is diffused better than the light emitted by the one or more second light sources 168.

At a low ambient light level, the ordering indication device 1 accordingly can reduce the brightness of the one or more second light sources 168 or completely switch off these light sources. Furthermore, the ordering indication device can adapt the brightness of the one or more first light sources 167 to the ambient light and to the brightness of the one or more second light sources 168 at a low ambient light level.

A table may be stored in the memory 130 of the ordering indication device 1, wherein said table contains brightness setting stages for the one or more first light sources 167 and the one or more second light sources 168, which correspond to different brightness ranges measured by the brightness sensor 145. The brightness ranges may be defined by two of a plurality of brightness threshold values. The corresponding brightness setting stages may also include a complete deactivation of the one or more first light sources 167 and/or the one or more second light sources 168 (setting to brightness stage zero). The brightness setting stages for the one or more first light sources 167 and/or the one or more second light sources 168 may include more than only two respective stages, for example three, four, five, ten or more brightness setting stages for the one or more first light sources 167 and two, three, four, five, ten or more brightness setting stages for the one or more second light sources 168.

Accordingly, the control unit 120 of the ordering indication device 1 can receive a brightness signal from the brightness sensor 145—if applicable after it passes through a resistor and/or capacitor circuit—and then determine the corresponding brightness of the one or more first light sources 167 and the one or more second light sources 168 to be set from the table stored in the memory 130, whereupon the control unit can set this brightness on the one or more first light sources 167 and the one or more second light sources 168.

Consequently, the ordering indication device is clearly visible under different ambient light conditions.

Synchronization by Reading Information

Figure 2:
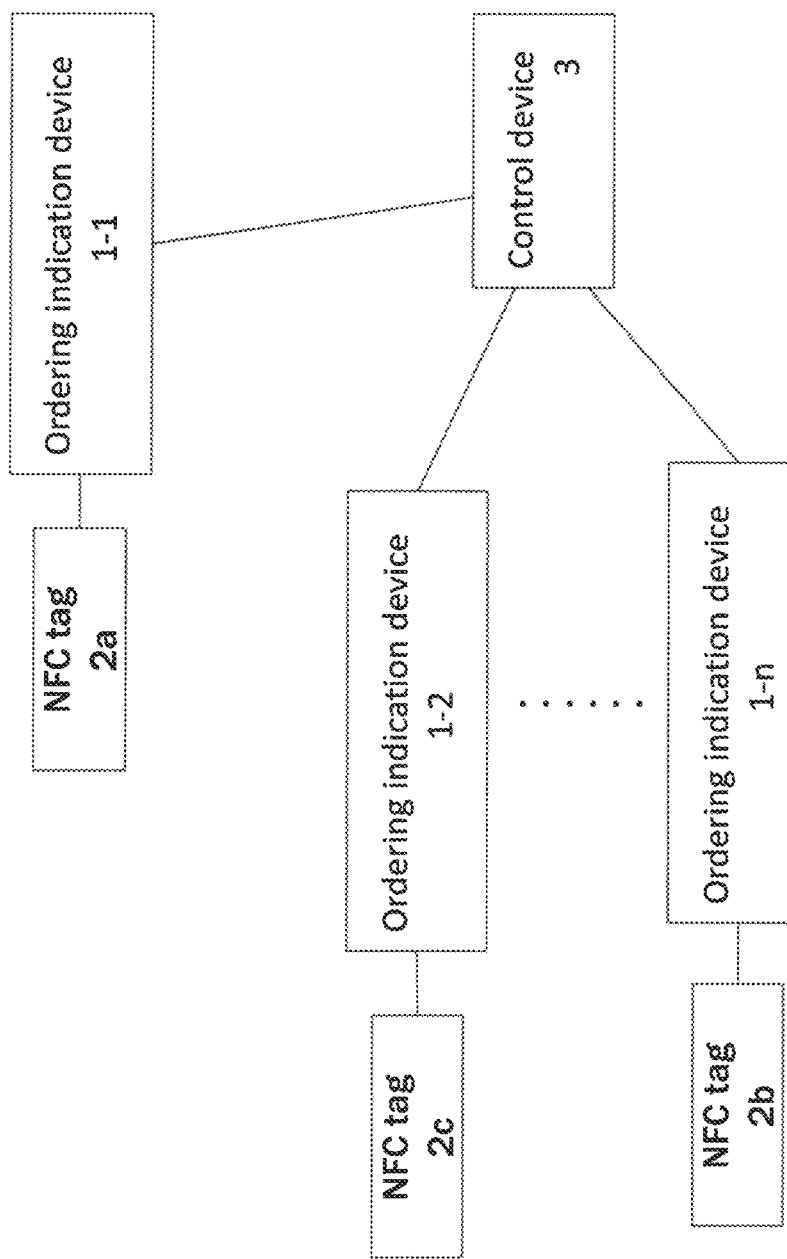
FIG. 2 shows a system with a plurality of ordering indication devices.

The ordering indication device has different settings options. A plurality of ordering indication devices may be used in a restaurant or hotel (see FIG. 2). The correct settings can vary for ordering indication devices that are positioned at different locations. The setting of the respective ordering indication device in accordance with its location may be realized by reading an information carrier as described with reference to an exemplary method 300 illustrated in FIG. 3. The information carrier may be realized, for example, in the form of a near-field communications tag, a radio signal, a WLAN signal and/or a Bluetooth® beacon or in any other form of information carrier.

In embodiments, the ordering indication device 1 furthermore comprises a reader for reading information from an information carrier such as a short-range wireless interface for reading a radio signal, particularly a WLAN interface for reading a WLAN signal, a Bluetooth® interface for reading a Bluetooth® beacon and/or a near-field communications reader for reading information from a near-field communications tag or in any other form of information carrier or reader.

In embodiments, a setting of the one or more first light sources and a setting of the one or more second light sources depend on information read by the reader.

For example, a setting of the one or more first light sources 167 and a setting of the one or more second light sources 168 can be realized in that an ordering indication device 1 is in a step 310 placed in the vicinity of an information carrier such as an NFC tag 2 (step 310). For example, the information carrier 2 may be arranged on, in or underneath a table. The information carrier may be installed, for example, in an object on the table (which is referred to as object or table object below). For example, the table object may be a holder. The table object may have a receptacle space for the ordering indication device 1. The table object may additionally or alternatively also have a receptacle space for spice shakers, particularly for salt, pepper and/or chili powder, a receptacle space for sauce containers, particularly (bottles of) soy sauce or chili sauce, space for silverware, space for menus and/or space for napkins. The holder particularly may be realized in the form of a salt/pepper holder or a napkin holder. If the information carrier is a signal, for example, a corresponding supplier (transmitter) of the signal may be arranged on, in or underneath a table and/or in the table object. For example, such a signal can be supplied by a transmitter, particularly a wireless signal transmitter, particularly by a WLAN interface or by a Bluetooth® beacon. An operator of a control device 3 (for example a waiter) can transmit a read command for reading out the information carrier located in the vicinity (step 320) from the control device 3 of the ordering indication device 1 via the communications interface 180, wherein the ordering indication device carries out this read command (330). The ordering indication device 1 reads out identity information, e.g. an NFC tag identity (NFC tag ID), from the information carrier, e.g. an NFC tag 2. The ordering indication device transmits this identity information (step 340) to the control device 3 via the communications interface 180 together with its own ordering indication device identity (ordering indication device ID).

The control device 3 therefore receives information on the information carrier, with which the ordering indication device is linked. Information on the location of each information carrier 2 and on the settings, with which the ordering indication device 1 was configured, may already be stored in a memory of the control device 3. If the current settings of the ordering indication device 1 are not the correct settings for the location near the now linked information carrier, the control device 3 can transmit the information for the correct configuration to the ordering indication device 1 (350). Consequently, the correct settings for the ordering indication device 1 at a new location do not have to be determined again from the ground up each time the ordering indication device is repositioned, but rather are defined by the link with the information carrier, e.g. the NFC tag. The ordering indication devices 1 may be repositioned, for example, because the ordering indication devices 1 are collected for charging at a charging station and the ordering indication devices 1 are placed at different locations after a plurality of ordering indication devices 1 have been charged (see FIG. 2). The configuration efficiency of the ordering indication devices can thereby be increased.

However, no configuration information may be transmitted if the control device 3 determines that the current settings of the ordering indication device 1 already are the correct settings for the location near the now linked information carrier. Since the configuration takes time, the efficiency for the correct configuration can thereby be additionally increased.

If the ordering indication device 1 receives configuration information via the communications interface 180, the control unit 120 of the ordering indication device 1 can configure the ordering indication device 1 in accordance with the configuration information. The configuration information may contain information regarding the settings of the one or more first light sources 167 and the one or more second light sources 168.

The setting of the ordering indication device by reading an information carrier makes it possible to ensure that the ordering indication device is correctly set in accordance with its location.

This leads to a particularly efficient individual setting of a plurality of ordering indication devices. The table assignment is thereby simplified and unambiguous.

Theft Prevention Arrangement

The ordering indication device 1 may contain a power source 140 such as a battery or an accumulator. The ordering indication device 1 is therefore easily transportable, but this easy transportability is also associated with the risk of theft of the ordering indication device 1 by guests.

Consequently, the ordering indication device 1 may be realized in such a way that theft of the ordering indication device 1 is respectively prevented or at least impeded.

In embodiments, the ordering indication device can be localized. A theft detection device is provided in embodiments, wherein said theft detection device is activated by means of signals and localizes the ordering indication device.

In embodiments, the ordering indication device is localized with the aid of a positioning system such as the Global Positioning System (GPS), GLONASS, Galileo, Beidou or any other global, regional or local positioning system.

In embodiments, a mesh network is used for detecting that an ordering indication device 1 is missing in the network. For example, a motion detector 150 can detect that an ordering indication device 1 is missing in the network (and therefore was moved and potentially stolen) with the aid of a mesh network.

The theft prevention may additionally or alternatively also be realized by means of a wireless apparatus that is installed in an object on the table. For example, an information carrier such as a beacon or an NFC may be linked to the object. For example, a wireless signal transmitter for a beacon or an NFC tag may be installed in the object. The information carrier can be read by the ordering indication device 1 as long as the ordering indication device is positioned sufficiently close to the information carrier, e.g. in the receptacle space. It is thereby determined that the distance between the object and the ordering indication device 1 is short.

If the ordering indication device 1 is removed from its receptacle space in the holder, the signal strength of the link between the object and the ordering indication device 1 drops or the signal link is entirely lost. It is thereby determined that the ordering indication device 1 was removed from the receptacle space, i.e. moved away from the object. An alarm is triggered if the ordering indication device 1 is not returned within a defined time period.

In embodiments, the theft protection may be realized by means of a magnetic field. For example, one or more permanent magnets or one or more coils may be arranged underneath the table. In this case, the ordering indication device 1 may be equipped with a magnetic field detection arrangement. The ordering indication device 1 triggers an alarm if the ordering indication device is removed from the table and not returned to the table within a time period that is defined by a server—such as a restaurant owner or a waiter—with the aid of the software/app.

In embodiments, the ordering indication device 1 furthermore comprises a theft prevention arrangement. In embodiments, the theft prevention arrangement comprises a theft detection device.

For example, the visibility can be enhanced by correspondingly setting the brightness of the one or more first light sources 167 and the brightness of the one or more second light sources 168 when the ordering indication device 1 is moved and/or accelerated due to an external force acting upon the ordering indication device 1 and/or the removal of the ordering indication device 1 from a receptacle space. Additionally or alternatively, the one or more first light sources 167 and/or the one or more second light sources 168 may blink and thereby additionally attract attention (and at the same time enhance the visibility). Blinking in the presently described context includes blinking in the actual sense (i.e. with largely immediate activation and deactivation) or pulsating (i.e. with increasing and decreasing signal strength) or a combination of actual blinking and pulsating.

Figure 4A:
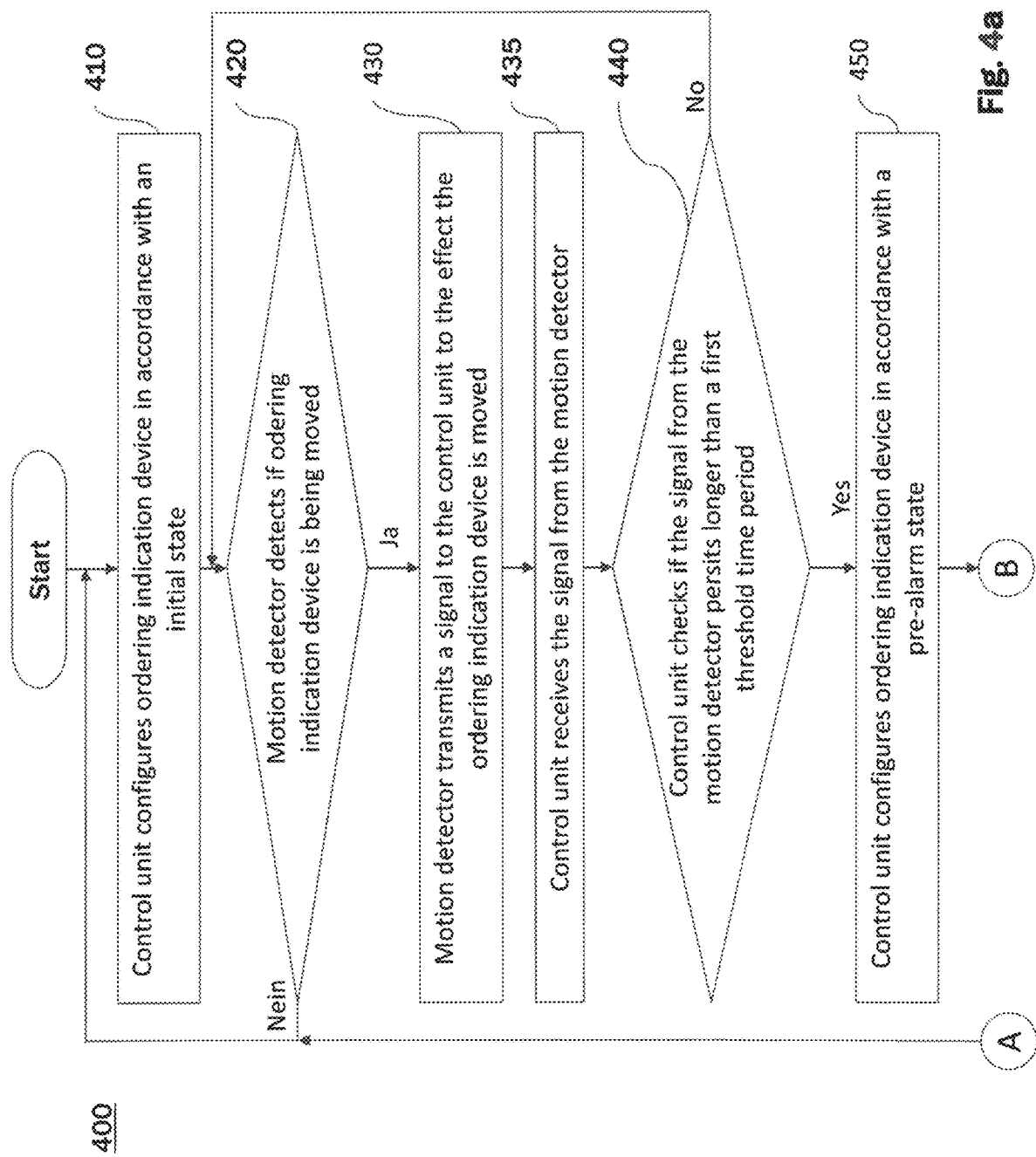
FIGS. 4a and 4b show a method for preventing the theft of the ordering indication device.
Figure 4B:
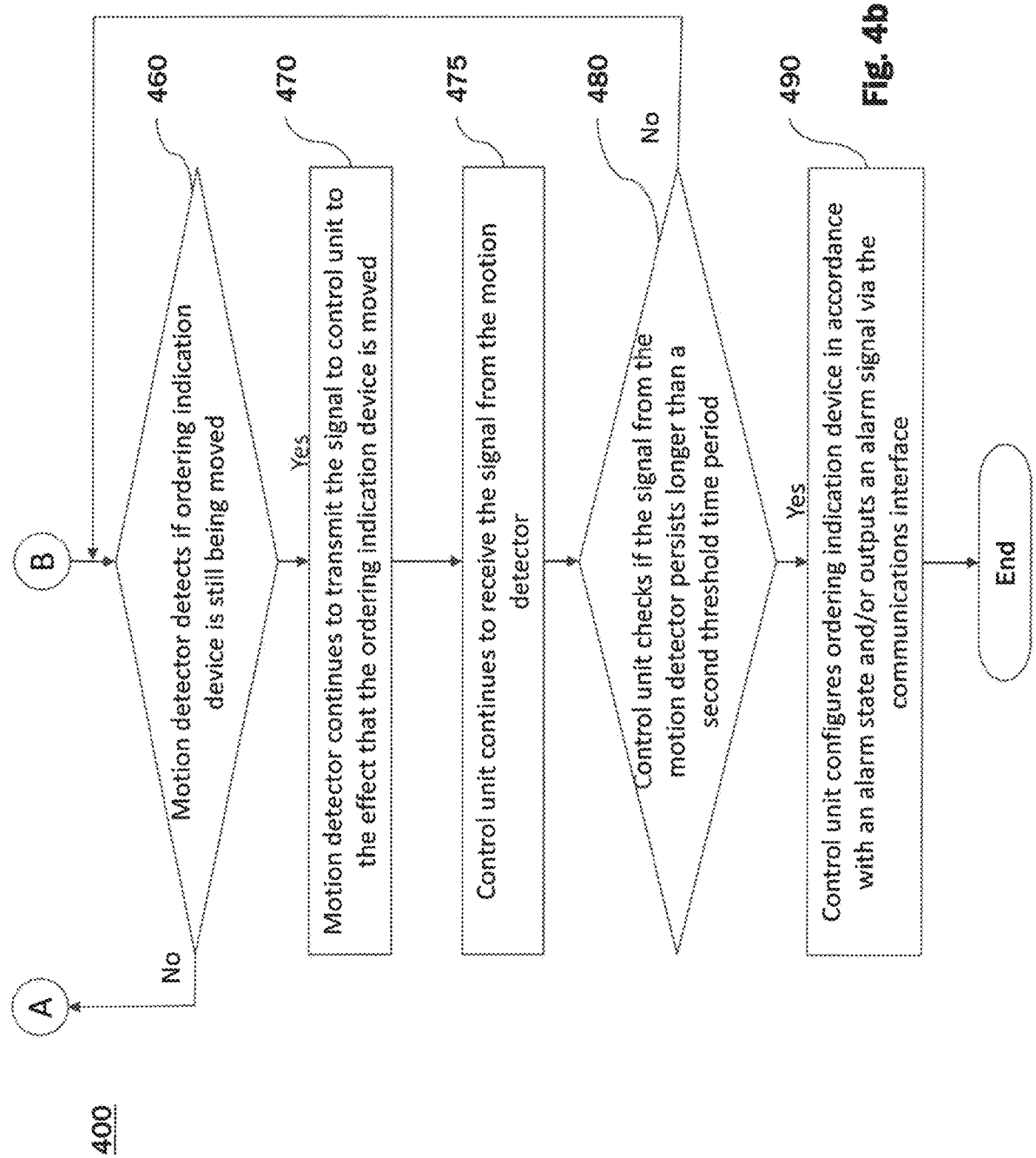

For example, the ordering indication device can trigger an alarm during an attempted theft of the ordering indication device. An exemplary method 400 for triggering an alarm during an attempted theft is described below with reference to FIGS. 4a and 4b.

The ordering indication device 1 may be in an initial state. If the ordering indication device 1 is in a different state, the ordering indication device 1 should at the beginning switch over into the initial state. In an optional step 410, the control unit 120 configures the ordering indication device in accordance with an initial state. The settings for the initial state may be stored in a memory 130 and can be defined beforehand from a control device 3 via the communications interface 180.

In step 420, a motion detector 150 of the ordering indication device 1 determines if the ordering indication device 1 is currently moved. For example, the motion detector 150 can determine if the ordering indication device 1 is currently moved with the aid of a positioning system such as the Global Positioning System (GPS), GLONASS, Galileo, Beidou or any other global, regional or local positioning system. The motion detector 150 can alternatively or additionally determine that the ordering indication device 1 has been moved away if an information carrier can no longer be read or if a WLAN signal or a beacon signal can no longer be received or only received with a signal strength that is weaker than a nominal value. The motion detector 150 can alternatively or additionally determine that the ordering indication device 1 has been moved away if a magnetic field detection arrangement of the ordering indication device 1 can no longer measure a magnetic field on an associated table or only measure a magnetic field strength that is weaker than a nominal value. The motion detector 150 may alternatively or additionally comprise a motion sensor and/or a gyroscope. The motion detector 150 may be capable of transmitting event signals to the control unit 120. For example, the motion detector 150 can derive event signals from positions of the positioning system and transmit these event signals to the control unit 120. The motion detector 150 may alternatively or additionally comprise a motion sensor and/or a gyroscope that is capable of transmitting event signals to the control unit 120. Additionally or alternatively, the control unit 120 or the motion detector 150 may only take into account certain relevant motion components of the signal of the motion detector (e.g. a motion component in a certain direction x). In other words, certain other, irrelevant motion components of the signal of the motion detector 150 can be ignored. For example, motions that merely concern a rotation of the ordering indication device 1 can be ignored in embodiments. This makes it easier to determine if an ordering indication device 1 is in the process of being stolen.

The motion detector 150 may refrain from transmitting a signal to the control unit 120 if the motion detector 150 detects that the ordering indication device 1 is not moved or not relevantly moved. The control unit 120 determines that the ordering indication device 1 is not moved or not relevantly moved due to the absence of the reception of a signal from the motion detector 150. Consequently, the control unit can optionally reconfigure the ordering indication device 1 in accordance with the initial state. In embodiments, in which the motion detector 150 detects that the ordering indication device 1 is moved away because a signal or a magnetic field is no longer received or measured at all or only in weakened form, the motion detector 150 may instead determine that the ordering indication device was returned if the weakened or no longer received signal or field is once again received or measured at all or with sufficient strength. Consequently, the control unit can optionally reconfigure the ordering indication device 1 in accordance with the initial state.

If the motion detector 150 detects that the ordering indication device 1 is moved or relevantly moved, the motion detector 150 may transmit a signal to the effect that the ordering indication device 1 is moved or relevantly moved to the control unit 120 (step 430).

Due to the reception of a signal from the motion detector 150 (step 435), the control unit determines that the ordering indication device 1 is moved or relevantly moved. Consequently, the control unit checks in step 440 if the signal from the motion detector 150 already persists longer than a first threshold time period. The first threshold time period may be stored in the memory 130 and can be set beforehand from a control device 3 via the communications interface 180. For example, it may amount to 5 to 15 s, e.g. approximately 10 s.

If the signal from the motion detector 150 does not persist longer than a first threshold time period, it is checked if the motion still continues (step 420 once again).

If the signal from the motion detector 150 already persists longer than a first threshold time period, the control unit configures (450) the settings of the ordering indication device in accordance with a pre-alarm state that may be stored in a memory 130 similar to the first threshold time period and can be set beforehand from a control device 3 via the communications interface 180.

The visibility of the ordering indication device 1 may be enhanced in the pre-alarm state in that the optical indicator means 160 begins to blink. A pre-alarm sound may alternatively or additionally be output via a loudspeaker 170. The ordering indication device 1 may alternatively or additionally vibrate. A pre-alarm signal may alternatively or additionally be transmitted to a receiving device.

It is subsequently checked if the motion still continues (step 460).

The motion detector 150 may refrain from transmitting a signal to the control unit 120 if the motion detector 150 detects that the ordering indication device is no longer moved or relevantly moved. The control unit 120 determines that the ordering indication device 1 is no longer moved or no longer relevantly moved due to the absence of the reception of a signal from the motion detector 150. The control unit 120 can now reconfigure the ordering indication device 1 in accordance with the initial state (step 410). In embodiments, in which the motion detector 150 detects that the ordering indication device 1 is moved away because a signal or a magnetic field is no longer received or measured at all or only in weakened form, the motion detector 150 may instead determine that the ordering indication device was returned if the weakened or no longer received signal or field is once again received or measured at all or with sufficient strength. Consequently, the control unit can optionally reconfigure the ordering indication device 1 in accordance with the initial state.

If the motion detector 150 detects that the ordering indication device 1 is moved or relevantly moved, the motion detector 150 may transmit a signal to the effect that the ordering indication device 1 is moved or relevantly moved to the control unit 120 (step 470). Due to the reception of the signal from the motion detector 150 (step 475), the control unit determines that the ordering indication device 1 is still moved or relevantly moved. Consequently, the control unit checks in step 480 if the signal from the motion detector 150 already persists longer than a second threshold time period, which is longer than or equal to the first threshold time period. The second threshold time period may be stored in the memory 130 and can be set beforehand from a control device 3 via the communications interface 180. For example, it may amount to 11 to 20 s, e.g. approximately 15 s. Alternatively, the additional time period starting with the expiration of the first threshold time period can be set. For example, this time period may amount to 0 to 10 s.

If the signal from the motion detector 150 does not yet persist longer than the second threshold time period, it is checked if the motion still continues (step 460 once again). The pre-alarm state persists.

If the signal from the motion detector 150 already persists longer than the second threshold time period, the control unit configures (490) the settings of the ordering indication device in accordance with an alarm state that may be stored in the memory 130 similar to the pre-alarm state and can be set beforehand from a control device 3 via the communications interface 180. In addition to the enhanced visibility of the pre-alarm state, an audio signal may also be output via a loudspeaker 170 in the alarm state. Furthermore, an alarm signal is transmitted to the control device 3 in the alarm state via the communications interface 180.

According to embodiments, the pre-alarm state can be omitted or deactivated such that the control unit configures 490 the settings of the ordering indication device in accordance with an alarm state if it is determined in step 440 that the signal from the motion detector 150 already persists longer than a first threshold time period.

Alternatively, the alarm state can be deactivated such that the control unit configures 450 the settings of the ordering indication device in accordance with a pre-alarm state if it is determined in step 440 that the signal from the motion detector 150 already persists longer than a first threshold time period, wherein the control unit no longer checks if the signal from the motion detector 150 already persists longer than the second threshold time period. It is optionally possible, in particular, to omit a (pre-)alarm output via loudspeakers.

An operator of the control device 3 (e.g. a waiter) is thereby informed that an ordering indication device 1 is in the process of being stolen, wherein the enhanced visibility and/or the audio output optionally enable said operator to easily locate the ordering indication device 1 and prevent its theft.

The visibility of the ordering indication device 1 may be enhanced in the pre-alarm state in that the optical indicator means 160 begins to blink. The one or more second light sources 168 may be more visible than the one or more second light sources 167. At least the one or more second light sources 168 may be activated or set to blink in order to enhance the visibility in an alarm state or a pre-alarm state. An alarm sound may alternatively or additionally be output via a loudspeaker 170. The ordering indication device 1 may alternatively or additionally vibrate. An alarm signal may alternatively or additionally be transmitted to a receiving device.

The method 400 makes it possible to more precisely enhance the visibility of the ordering indication device 1 exactly at the time, at which the ordering indication device 1 is in the process of being stolen.

Figure 5:
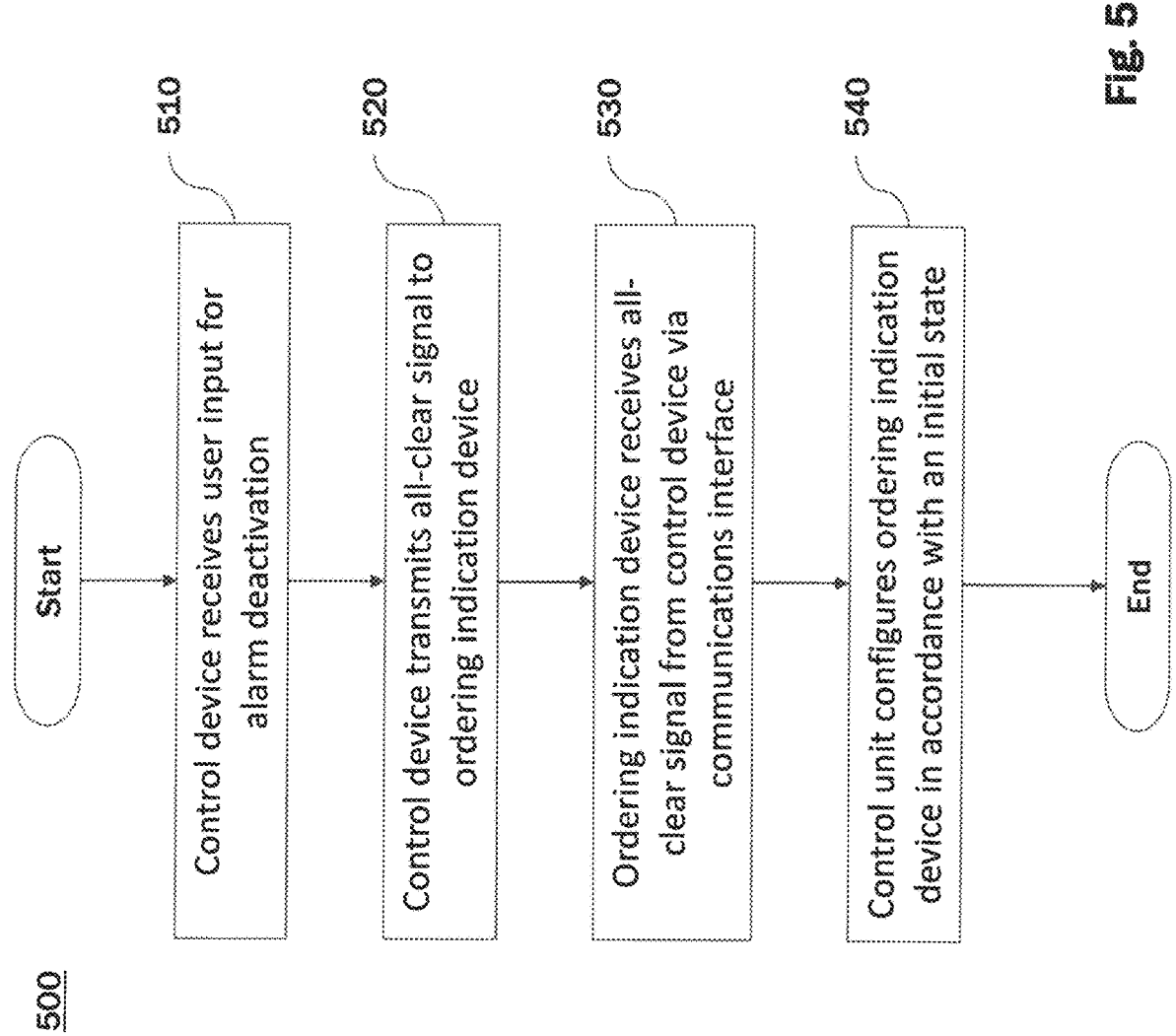
FIG. 5 shows a method for outputting an all-clear signal regarding a theft of the ordering indication device.

It should be noted that the ordering indication device 1 does in an embodiment not automatically switch over from an alarm state into an initial state, but rather requires the reception of an all-clear signal via the communications interface 180 (see FIG. 5). For example, an operator of the control device 3 (e.g. a waiter) enters a command for deactivating the alarm into the control device 3. This control device then transmits an all-clear signal to the ordering indication device (step 520). In step 530, the ordering indication device receives the all-clear signal via the communications interface 180. Consequently, the control unit reconfigures the ordering indication device in accordance with an initial state (step 540).

This ensures that the visibility remains enhanced as long as the ordering indication device is in the process of being stolen.

Light Conductor

Figure 7:
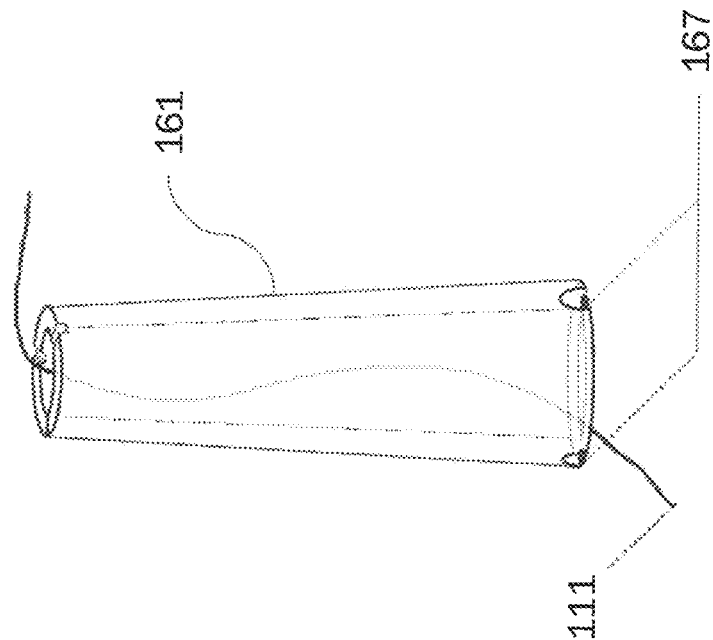
FIG. 7 shows the light conductor according to FIG. 6, wherein a cable routing is schematically illustrated.
Figure 6:
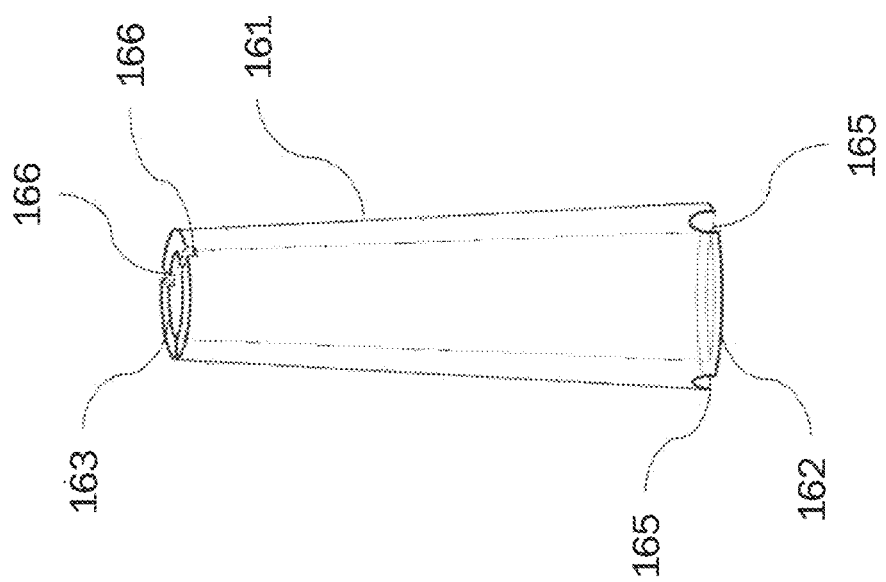
FIG. 6 shows a light conductor that may be installed in an embodiment of the ordering indication device.

According to FIGS. 6, 7 and 8, the optical indicator means 160 comprises a light conductor 161 in embodiments. This light conductor 161 may essentially have the shape of a hollow truncated cone or a tapered hollow cylinder. One or more recesses 165 for receiving the one or more first light sources 167 may be arranged on a lower end 162 of the light conductor 161. The one or more first light sources 167 may be RGB-LEDs. The one or more first light sources 167 may be arranged father inward than the one or more first light sources 168. Since the first light sources 167 are positioned on the bottom in the recesses 165 in the light conductor wall, the light of the first light sources is diffused in a particularly homogenous manner due to the conical shape of the light conductor 161. The light conductor 161 may be made of a transparent material such as a transparent plastic, e.g. a polycarbonate mixture. The outer surface of the light conductor 161 may be dull. This can be realized by roughening the surface. The inner surface of the light conductor 161 may be smooth.

The light conductor may contain one or more upper recesses 166 on an upper end 163. A cable 111, e.g. for connecting an input means 110 to the control unit, can be routed through the hollow space of the light conductor 161 and optionally through the upper recesses 166 of the light conductor 161.

This ensures that the cable 111 does not cast a shadow. The visibility of the ordering indication device 1 is thereby additionally enhanced.

The one or more second light sources 168 may be arranged outside the light conductor 161 (see FIG. 8), but in the ordering indication device 1. In this way, the visibility of the one or more second light sources 168 is enhanced in comparison with the one or more first light sources 167 arranged in or underneath the light conductor 61 because light, which has to pass through the light conductor, is partially reflected on the dull surface of the light conductor 161. The visibility can be enhanced by arranging the one or more second light sources 168 outside the light conductor 161 (but in the ordering indication device 1).

Since the first light sources 167 and the second light sources 168 can be separately controlled, the visibility can be adapted well to the external conditions.

Reservation

In embodiments, the ordering indication device 1 comprises a reservation state (or "reserved mode"), wherein in the reservation state, the optical indicator means 160 is configured to be indicative of the reservation.

The ordering information device may further comprise a clock unit which automatically changes the state of the ordering indication device 1 to a prominent "reserved" indication several minutes before a reservation is due.

The process may be the following: When a staff member enters a new reservation to a table via a control device 3, e.g. a terminal, the time is instantly sent to the corresponding ordering indication device 1 positioned at the table.

The clock unit receives a time stamp and may make the ordering indication device 1 enter the reserved mode as soon as this time for it is reached. The information is kept up to date by the control device 3 (e.g. a terminal) and is not ultimately bound to a single ordering indication device 1 in case the ordering indication device 1 on the relevant table has to be replaced. While an ordering indication device 1 is in reservation state, it cannot be operated (by the guest for indicating a readiness to order). The reservation state can be deactivated via the control device 3 (e.g. a terminal) or by pressing a button combination (more generally actuating a plurality of input means 110).

The ordering indication device 1 may indicate that it is in the reservation state by its optical indicator means 160. For example, the optical indicator means 160 may be configured to have a specific color, e.g. red or blue. Alternatively or additionally, when the optical indicator means 160 comprises a flat-screen display, e.g. a touchscreen, the reservation state may be indicated by displaying a term of reservation flat-screen display, e.g. displaying "reserved", and optionally a time of reservation.

Projector

In embodiments, the ordering indication device 1 furthermore comprises a projector, wherein the projector is designed for projecting information on a placement surface of the ordering indication device 1. The projector may be positioned in an upper half of the ordering indication device 1. This has the advantage that the distance from the projector to the placement surface is somewhat greater and a distortion caused by the projection may be reduced.

For example, the placement surface of the ordering indication device 1 may be a table surface. For example, the information projected on the placement surface may be a menu suggestion.

In embodiments, the control unit furthermore takes into account the brightness of the projected information in the setting of the brightness of the one or more first light sources and in the setting of the brightness of the one or more second light sources.

Payment Function

In embodiments, the ordering indication device 1 is configured to accept payment via near-field communications.

As explained above, the ordering information device 1 may further comprise an NFC reader 190. In particular, the ordering information device 1 may comprise an NFC chipset containing an NFC coil and an encryption unit to accept payment via NFC. As soon as a guest is willing to pay, the guest may actuate a corresponding input means 110, e.g. tap a corresponding button. A light-based indication shows that the device is now ready to accept the NFC-based payment item. Optionally in some variations the ordering information device 1 further contains a numerical display showing the amount to be paid. In cases that the optical indicator means 160 includes a flat-screen display, the flat-screen display may be used to indicate the amount to be paid. The guest now can put the guest's NFC-payment-card or NFC-payment-mobile-device directly on the ordering information device 1. The NFC chipset may be arranged near a specific location, e.g. at a pay button (an input means 110). Thereby, the guest may know where specifically to put the NFC payment card or NFC payment mobile device (in the example on the pay button). Subsequently, the NFC chipset reads out the payment information, the encryption unit encrypts it and proceeds it to the control device 3 (e.g. a terminal). The control device 3 (the terminal) is connected to the Internet and the database containing the information about the amount to be paid. Both pieces of information are then proceeded to the payment acceptance provider via an API.

Figure 9:
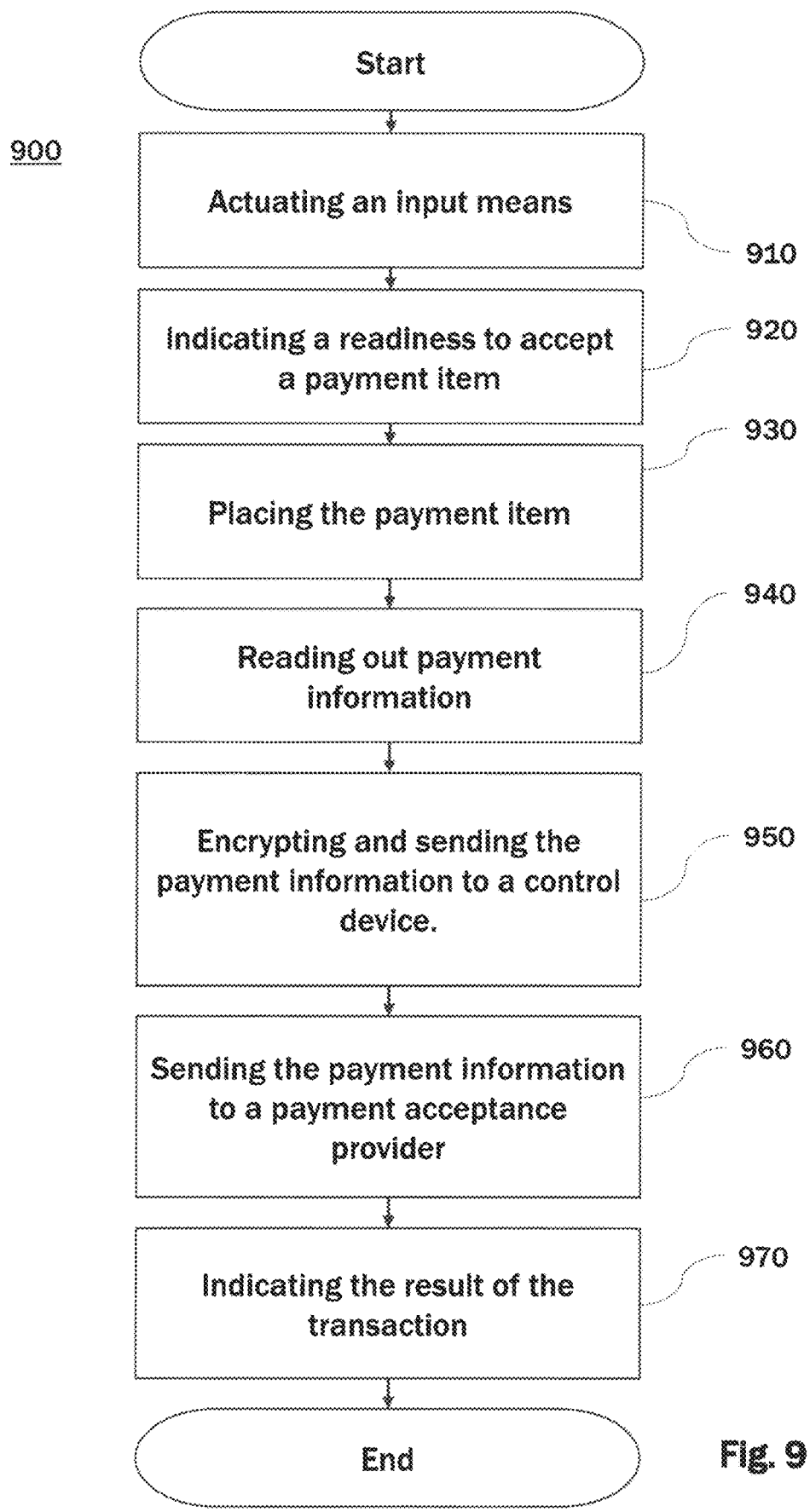
FIG. 9 shows a method for using a payment function of the ordering indication device.

FIG. 9 shows an example of a method 900 for using the payment function of the ordering indication device. In step 910, the guest may actuate a corresponding input means 110. In step 920, an indication is given that the device is now ready to accept the payment item, which may be an NFC-based payment item (such as an NFC payment card or an NFC payment mobile device) or any other payment item. In step 930, the payment item (e.g. NFC payment item) is placed. In step 940, a reader, e.g. an NFC reader, reads out the payment information. In step 950, an encryption unit encrypts the payment information and the ordering indication device 1 sends it to the control device 3. In step 960, the control device 3 sends the payment information optionally along with further information to a payment acceptance provider. In step 970, a result of the transaction is indicated.

There are three possible options, how the payment process may continue:

a.) If the transaction is returned as successful, the control device 3 (the terminal) notifies the relevant ordering information device 1 about it and it indicates this to the user via a success sound output through a loudspeaker 170 and/or an indication via the optical indicator means 160, e.g. by a corresponding light indication.

b.) If the transaction was not successful, this may be indicated differently via an error sound through the loudspeaker 170 and/or an indication via the optical indicator means 160, e.g. by a corresponding light indication.

c.) For certain transaction types, a staff member may receive a notification on the staff member's control device 3 (the terminal) and may approach the guest for allowing the guest to verify the transaction directly via the control device 3 (the terminal) of the staff member to proceed the payment. In the variation case that the ordering information device 1 contains a flat-screen device (e.g. a touchscreen), this step can be performed directly on the ordering information device 1 without an interaction with a staff member.

In some variations the ordering information device is connected to a smart mobile device that shows the amount to be paid or can be used to proceed the payment.

After a payment has been performed, the table is marked differently on a control device table map (a terminal table map) and a notification is proceeded to a staff member's control device 3 (a terminal) to inform that the guests have paid and are allowed to leave.

Further Variants

In embodiments, the ordering indication device 1 further comprises a proximity detection device for detecting a presence of a counterpart (a waitstaff) in the proximity of the ordering indication device 1 for causing a deactivation of the optical continuous signal. The presence of the waitstaff may be detected by the presence of a control device 3, e.g. a terminal. In order to actually cause a deactivation of the optical continuous signal, the proximity detection device may be required to detect the presence of the counterpart (the waitstaff/the control device 3) in the proximity of the ordering indication device 1 for at least a pre-determined amount of time, e.g. 15 seconds.

In embodiments, the ordering indication device 1 further comprises a plurality of sensor devices 145, 150 coupled to the control unit 120, wherein the control unit 120 of the ordering indication device 1 combines data received from the plurality of sensor devices 145, 150 to control the optical indicator means 160 such that it mimics a candle behavior.

As already mentioned, the ordering information device 1 may contain a motion detector, a brightness sensor, a clock unit and a proximity detection (which may be considered as sensor devices). These components may be able to co-operate with each other and thus may be able to render the ordering indication device 1 very adaptive (reacting) to its environment. This way an ordering information device 1 may be able to adapt its brightness, colors or animations for example in the candle mode based on the time, the surrounding brightness, the vibration it detects or the distance of the staff member. The data gathered by the components can be combined individually, solely or all together to provide a maximally (i.e. very) adaptive behavior (i.e. reacting to its environment) of the ordering information device 1.

In some variations, some examples can be the following:

a.) An ordering information device 1 can change its color or brightness based on the brightness sensor and/or clock unit. (Daymode/Nightmode etc.) (see also chapter Brightness Setting according to Ambient Light)

b.) An ordering information device 1 can trigger a signal based on the proximity of a staff member.

c.) A candle animation of the ordering information device 1 can be bound to the vibrations that the motion detector 150 detects or to adapt to the surrounding music such that the candle animation appears more authentic.

Additional Aspects

The present disclosure also concerns the following numbered aspects:

1. An ordering indication device (1) for use in restaurants, guest houses and the like, wherein the ordering indication device (1) comprises an input means (110) that can be actuated by a guest, a communications interface (180), a memory (130), an optical indicator means (160) and a control unit (120), wherein the optical indicator means (160) comprises one or more first light sources (167) and one or more second light sources (168), wherein the setting of the brightness of the one or more first light sources (167) and the setting of the brightness of the one or more second light sources (168) depend on an environmental condition, wherein the input means (110) is functionally connected to the optical indicator means (160) via the control unit (120) in such a way that the optical indicator means (160) signals the actuation process of the input means (110) by means of an optical signal after the activation of the optical indicator means by the input means (110), wherein the optical indicator means (160) outputs after its activation an optical continuous signal that can be deactivated, and wherein an apparatus for measuring the time period since the activation of the optical continuous signal is provided.

2. The ordering indication device (1) according to numbered aspect 1, wherein the ordering indication device (1) furthermore comprises a brightness sensor (145) for measuring the ambient brightness, and wherein the ordering indication device (1) furthermore is configured for adapting the brightness of the one or more first light sources (167) and the one or more second light sources (168) to the measured ambient brightness.

3. The ordering indication device (1) according to numbered aspect 1 or 2, wherein the ordering indication device (1) furthermore comprises a communications reader for reading information from a communications tag, wherein optionally the communications reader is a near-field communications reader for reading information from a near-field communications tag.

4. The ordering indication device (1) according to numbered aspect 3, wherein a setting of the one or more first light sources (167) and a setting of the one or more second light sources (168) depend on information read by the communications reader.

5. The ordering indication device (1) according to one of numbered aspects 1 to 4, wherein the ordering indication device furthermore comprises a motion detector (150), and wherein the ordering indication device (1) is configured for triggering an alarm (490) during an attempted theft of the ordering indication device (1).

6. The ordering indication device (1) according to numbered aspect 5, wherein the output (490) of the alarm signal includes blinking of the optical output means (160), particularly the one or more second light sources (168).

7. The ordering indication device (1) according to numbered aspect 5 or 6, wherein the ordering indication device (1) furthermore comprises a loudspeaker (170), and wherein the output (490) of the alarm signal includes an audio output via the loudspeaker (170).

8. The ordering indication device (1) according to one of numbered aspects 5 to 7, wherein the output (490) of the alarm signal includes an electronic transmission of an alarm signal to a control device (3) via the communications interface (180).

9. The ordering indication device (1) according to one of numbered aspects 5 to 8, wherein the output (490) of the alarm signal takes place in stages, wherein the control unit (120) initiates (450) a first of the stages if the motion detector (150) transmits (430) a signal to the control unit (120) longer than a first threshold time period and the control unit (120) initiates (490) a second of the stages if the motion detector (150) transmits (470) a signal to the control unit (120) longer than a second threshold time period.

10. The ordering indication device (1) according to one of numbered aspects 1 to 9, wherein the optical output means (160) furthermore comprises a light conductor (161), and wherein the light conductor (161) furthermore is essentially realized in the form of a hollow truncated cone or a tapered hollow cylinder.

11. The ordering indication device (1) according to numbered aspect 10, wherein the light conductor (161) comprises on a first end (162) one or more first recesses (165), wherein the one or more first light sources (167) are respectively arranged in the one or more first recesses (165), and wherein the one or more second light sources (168) are arranged in the ordering indication device (1) farther outward than the one or more first light sources (167).

12. The ordering indication device (1) according to numbered aspect 10 or 11, wherein the light conductor (161) comprises on a second end (163) at least one second recess (166) for leading through at least one cable (111).

13. The ordering indication device (1) according to one of numbered aspects 1 to 12, wherein the ordering indication device (1) furthermore comprises a projector, wherein the projector is designed for projecting information on a placement surface of the ordering indication device (1), and wherein the brightness of the projected information furthermore is taken into account in the setting of the brightness of the one or more first light sources (167) and in the setting of the brightness of the one or more second light sources (168).

14. A system with a plurality of ordering indication devices according to one of numbered aspects 1 to 13 and a corresponding plurality of near-field communications tags (2), wherein the plurality of ordering indication devices (1) respectively comprise a near-field communications reader for reading information from the plurality of near-field communications tags, and wherein the plurality of ordering indication devices can be wirelessly connected to a control device (3) via the respective communications interfaces (180).

15. A method for setting an optical indicator means (160) of an ordering indication device (1) that comprises an input means (110), a communications interface (180), a motion detector (150), a memory (130), the optical indicator means (160) and a control unit (120), wherein the optical indicator means (160) comprises one or more first light sources (167) and one or more second light sources (168), wherein the input means (110) is functionally connected to the optical indicator means (160) in such a way that the optical indicator means (160) signals the actuation process of the input means (110) by means of an optical signal after the activation of the indicator means by the input means (110), wherein the optical indicator means (160) outputs after its activation an optical continuous signal that can be deactivated, wherein an apparatus for measuring the time period since the activation of the optical continuous signal is provided, and wherein the setting of the brightness of the one or more first light sources (167) and the setting of the brightness of the one or more second light sources (168) depend on an environmental condition.

The present disclosure also concerns the following numbered sentences:

1. A personnel call system for restaurants, guest houses and the like with an input means that can be operated by a guest and is equipped with a transmitter, wherein the transmitter transmits a signal, which provides information on an order request of a guest and optionally additional information, to at least one receiving device, characterized in that the input means is functionally connected to the indicator means in such a way that the indicator means signals the actuation process of the input means by means of an optical signal after the activation of the indicator means by the input means, wherein the optical indicator means outputs after its activation an optical continuous signal that can be deactivated, and wherein an apparatus for measuring the time period since the activation of the optical continuous signal is provided.

2. The personnel call system according to numbered sentence 1, characterized in that an apparatus for measuring the time period since the activation of the optical continuous signal is provided.

3. The personnel call system according to numbered sentence 1 or 2, characterized in that the light intensity of the optical continuous signal is varied in dependence on the time.

4. The personnel call system according to one of the preceding numbered sentences, characterized in that the color of the optical continuous signal is varied in dependence on the time.

5. The personnel call system according to one of the preceding numbered sentences, characterized in that the frequency of the optical continuous signal is varied in dependence on the time.

6. The personnel call system according to one of the preceding numbered sentences, characterized in that the variation of the color, the light intensity and/or the frequency of the optical continuous signal takes place in time intervals.

7. The personnel call system according to one of the preceding numbered sentences, characterized in that the variation of the color, the light intensity and/or the frequency of the optical continuous signal depends on an operating state of the personnel call system and/or on one or more input parameters on the input means.

8. The personnel call system according to one of the preceding numbered sentences, characterized in that it comprises a brightness sensor.

9. The personnel call system according to one of the preceding numbered sentences, characterized in that it comprises an interface for the programmable access by means of a software/app.

10. The personnel call system according to one of the preceding numbered sentences, characterized in that it comprises a charging station, at which multiple service personnel call systems can be coupled to coupling elements of the charging station adjacent to one another.

11. The personnel call system according to one of the preceding numbered sentences, characterized in that the personnel call system is protected against theft.

The design of the ordering indication device 1 is not limited to the embodiments described above. In fact, it would be conceivable to realize a plurality of variations that also utilize the proposed solution in a basically different type of design.

LIST OF REFERENCE SYMBOLS

1 Ordering indication device
2 Near-field communications tag
3 Control device
100 Input means
111 Cable
120 Control unit
130 Memory
140 Power source
145 Brightness sensor
150 Motion detector
160 Optical indicator means
161 Light conductor
162 Lower end of light conductor
163 Upper end of light conductor
165 Lower recess
166 Upper recess
167 Inner RGB-LEDs
168 Outer RGB-LEDs
170 Loudspeaker
180 Communications interface

What is claimed is:

1. An ordering indication device, comprising:
an input means that can be actuated by a user;
a communications interface;
an optical indicator means;
a control unit; and
a motion detector, wherein the optical indicator means comprises one or more first light sources and the setting of the brightness of the one or more first light sources depends on an environmental condition, wherein the input means is functionally connected to the optical indicator means via the control unit in such a way that the optical indicator means signals the actuation process of the input means by means of an optical signal after the activation of the optical indicator means by the input means, wherein the optical indicator means outputs after its activation an optical continuous signal that can be deactivated, wherein the ordering indication device is configured to output an alarm signal during an attempted theft of the ordering indication device, wherein the output of the alarm signal takes place in stages, wherein the control unit initiates a first of the stages if the motion detector transmits a signal to the control unit longer than a first threshold time period, and the control unit initiates a second of the stages if the motion detector transmits a signal to the control unit longer than a second threshold time period.

2. The ordering indication device according to claim 1, wherein the ordering indication device updates a firmware thereof via the communication interface.

3. The ordering indication device according to claim 1, wherein the motion detector detects if the ordering indication device is moved with the aid of a positioning system.

4. The ordering indication device according to claim 1, wherein the motion detector detects that an ordering indication device is missing in the network using a mesh network.

5. The ordering indication device according to claim 1, wherein the output of the alarm signal includes blinking of the optical output means, particularly the one or more second light sources.

6. The ordering indication device according to claim 1, wherein the ordering indication device further comprises a loudspeaker (170), and wherein the output of the alarm signal includes an audio output using at least one of the loudspeaker or a vibration.

7. The ordering indication device according to claim 1, wherein the output of the alarm signal comprises an electronic transmission of an alarm signal to a control device via the communications interface.

8. An ordering indication device (1), comprising:
an input means that can be actuated by a user;
a communications interface;
an optical indicator means; and
a control unit, wherein the optical indicator means comprises one or more first light sources and the setting of the brightness of the one or more first light sources depends on an environmental condition, wherein the input means is functionally connected to the optical indicator means via the control unit in such a way that the optical indicator means signals the actuation process of the input means by means of an optical signal after the activation of the optical indicator means by the input means, and wherein the optical indicator means outputs after its activation an optical continuous signal that can be deactivated, wherein the ordering indication device receives a reservation signal, and in response to the reservation signal, the ordering indication device enters a reservation state, wherein in the reservation state, the optical indicator means is configured to be indicative of a reservation.

9. The ordering indication device according to claim 8, wherein the ordering indication device further comprises a motion detector, and wherein the ordering indication device is configured to output an alarm signal during an attempted theft of the ordering indication device.

10. The ordering indication device according to claim 9, wherein the motion detector detects if the ordering indication device is moved with the aid of a positioning system.

11. The ordering indication device according to claim 8, wherein the ordering indication device updates a firmware thereof via the communication interface.

12. An ordering indication device, comprising:
an input means that can be actuated by a user;
a communications interface;
an optical indicator means;
a control unit; and
a projector, wherein the optical indicator means comprises one or more first light sources and the setting of the brightness of the one or more first light sources depends on an environmental condition, wherein the input means is functionally connected to the optical indicator means via the control unit in such a way that the optical indicator means signals the actuation process of the input means by means of an optical signal after the activation of the optical indicator means by the input means, and wherein the optical indicator means outputs after its activation an optical continuous signal that can be deactivated, wherein the optical indicator means further comprises one or more second light sources, and wherein the setting of the brightness of the one or more second light sources depends on the environmental condition, wherein the projector is configured to project information on a placement surface of the ordering indication device, and wherein the brightness of the projected information furthermore is taken into account in the setting of the brightness of the one or more first light sources and in the setting of the brightness of the one or more second light sources.

13. The ordering indication device according to claim 12, wherein the ordering indication device further comprises a motion detector, and wherein the ordering indication device is configured to output an alarm signal during an attempted theft of the ordering indication device.

14. The ordering indication device according to claim 13, wherein the motion detector detects that an ordering indication device is missing in the network using a mesh network.

15. The ordering indication device according to claim 12, wherein the ordering indication device updates a firmware thereof via the communication interface.

16. An ordering indication device, comprising:
an input means that can be actuated by a user;
a communications interface;
an optical indicator means; and
a control unit, wherein the optical indicator means comprises one or more first light sources and the setting of the brightness of the one or more first light sources depends on an environmental condition, wherein the input means is functionally connected to the optical indicator means via the control unit in such a way that the optical indicator means signals the actuation process of the input means by means of an optical signal after the activation of the optical indicator means by the input means, and wherein the optical indicator means outputs after its activation an optical continuous signal that can be deactivated, wherein the ordering indication device further comprises a proximity detection device for detecting a presence of a waiter in the proximity of the ordering indication device for causing a deactivation of the optical continuous signal.

17. The ordering indication device according to claim 16, wherein the ordering indication device further comprises a motion detector, and wherein the ordering indication device is configured to output an alarm signal during an attempted theft of the ordering indication device.

18. The ordering indication device according to claim 17, wherein the output of the alarm signal includes blinking of the optical output means, particularly the one or more second light sources.

19. The ordering indication device according to claim 17, wherein the ordering indication device further comprises a loudspeaker, and wherein the output of the alarm signal includes an audio output using at least one of the loudspeaker or a vibration.

20. The ordering indication device according to claim 17, wherein the output of the alarm signal comprises an electronic transmission of an alarm signal to a control device via the communications interface.

21. The ordering indication device according to claim 16, wherein the ordering indication device updates a firmware thereof via the communication interface.

* * * * *